US006971203B1

United States Patent
Foor et al.

(10) Patent No.: US 6,971,203 B1
(45) Date of Patent: Dec. 6, 2005

(54) SPRING LOADED FISHING ROD

(76) Inventors: Darryl F. Foor, 204 Tranquility Dr., Ruther Glen, VA (US) 22546; L. Suzanne Foor, 204 Tranquility Dr., Ruther Glen, VA (US) 22546

( * ) Notice: Subject to any disclaimer, the term of this patent is extended or adjusted under 35 U.S.C. 154(b) by 63 days.

(21) Appl. No.: 10/610,608

(22) Filed: Jul. 1, 2003

(51) Int. Cl.⁷ .................. A01K 91/02; A01K 87/02
(52) U.S. Cl. ......................... 43/19; 43/181 CT
(58) Field of Search ........................ 43/19.2, 18.1 R, 43/18.1 CT

(56) References Cited

U.S. PATENT DOCUMENTS

| | | | | |
|---|---|---|---|---|
| 1,434,768 A | * | 11/1922 | Boggess .................. | 43/19 |
| 1,442,813 A | * | 1/1923 | Lobit ................. | 43/18.1 CT |
| 1,731,173 A | * | 10/1929 | Pope .................. | 43/18.1 CT |
| 1,874,246 A | * | 8/1932 | Cowdery .............. | 43/18.1 R |
| 2,089,744 A | * | 8/1937 | Golden .................. | 43/19 |
| 2,187,807 A | * | 1/1940 | Muckey ................. | 43/19 |
| 2,217,820 A | * | 10/1940 | Rowe .................. | 43/19 |
| 2,276,524 A | * | 3/1942 | Taylor ................ | 43/18.1 R |
| 2,306,638 A | * | 12/1942 | Meisler ............... | 43/18.1 R |
| 2,351,734 A | * | 6/1944 | Backe ................ | 43/18.1 CT |
| 2,538,306 A | * | 1/1951 | Clifton et al. ........ | 43/18.1 R |
| 2,538,338 A | * | 1/1951 | Sturdevant ............ | 43/18.1 R |
| 2,548,102 A | * | 4/1951 | Elliott .................. | 43/19 |
| 2,671,289 A | * | 3/1954 | McCullough ........... | 43/19 |
| 2,759,288 A | * | 8/1956 | Bratek ................ | 43/18.1 R |
| 2,823,482 A | * | 2/1958 | Kremski ................ | 43/19 |
| 2,849,824 A | * | 9/1958 | McGee ................. | 43/19 |
| 2,875,548 A | * | 3/1959 | Stewart ................. | 43/19 |
| 3,216,144 A | * | 11/1965 | Vojinov ............... | 43/18.1 R |
| 3,365,834 A | * | 1/1968 | Kreft .................... | 43/19 |
| 3,400,480 A | * | 9/1968 | Worsham ............... | 43/19 |
| 3,416,256 A | * | 12/1968 | Blocker ................. | 43/19 |
| 3,507,069 A | * | 4/1970 | Borba, Sr. ............ | 43/18.1 R |
| 3,570,164 A | * | 3/1971 | Tozier .................. | 43/18.1 R |
| 3,656,252 A | * | 4/1972 | Sherman ................. | 43/19 |
| 3,962,813 A | * | 6/1976 | Moon ..................... | 43/19 |
| 4,501,085 A | * | 2/1985 | Barnes ................... | 43/19 |
| 4,656,773 A | * | 4/1987 | Klefbeck ............. | 43/18.1 CT |
| 4,800,668 A | * | 1/1989 | Burrough ............. | 43/18.1 R |
| 4,860,485 A | * | 8/1989 | Rhoton et al. ....... | 43/18.1 CT |
| D325,421 S | * | 4/1992 | Yasui .................. | D22/142 |
| 5,193,298 A | * | 3/1993 | O'Neill ................ | 43/19 |
| 5,491,924 A | * | 2/1996 | Athanasiadis .......... | 43/19 |

(Continued)

FOREIGN PATENT DOCUMENTS

CA        806961 B1 *   2/1969

(Continued)

*Primary Examiner*—Darren W. Ark

(57) ABSTRACT

The spring loaded fishing rod is a fresh or salt water fishing rod that allows a fisherman to cast without using any swinging force of the arm. This allows the angler more accurate casting as well as aiding him when casting from beneath trees or in dense underbrush. The first version of the present invention is basically a spring loaded fishing rod wherein the top portion of the rod slides into the lower portion of the rod, compressing a spring which propels the lure in the desired direction when the tension is released. The second version of the present invention can be added on to an existing rod and features a spring loaded cartridge with two eye hooks which is suspended from the last two eyes on the existing rod. The end eye slides along the cartridge to compress the enclosed spring. In the third version of the present invention, the spring is loaded in the distal portion of the rod, and the end eye slides through the tube to compress the spring. In all of the versions, the fisherman compresses the spring by winding the lure up to the end eye and then continuing to reel in the line.

1 Claim, 4 Drawing Sheets

U.S. PATENT DOCUMENTS

| | | | | |
|---|---|---|---|---|
| 5,926,991 | A * | 7/1999 | Chesnut | 43/19 |
| 5,934,005 | A * | 8/1999 | Utsuno et al. | 43/18.1 R |
| 5,946,845 | A * | 9/1999 | Yasui et al. | 43/18.1 R |
| 6,612,064 | B2 * | 9/2003 | Benit | 43/19 |
| 2004/0134115 | A1 * | 7/2004 | Wyman et al. | 43/19 |

FOREIGN PATENT DOCUMENTS

| | | | | | |
|---|---|---|---|---|---|
| FR | 639678 | A1 * | 6/1928 | | 43/18.1 R |
| FR | 814070 | B1 * | 6/1937 | | 43/19 |
| FR | 881119 | A1 * | 4/1943 | | 43/19 |
| FR | 1003302 | B1 * | 3/1952 | | |
| FR | 1020530 | B1 * | 2/1953 | | 43/19 |
| FR | 958526 | A1 * | 9/1953 | | 43/19 |
| FR | 1468399 | B1 * | 2/1967 | | 43/18.1 R |
| GB | 682096 | A1 * | 11/1952 | | 43/18.1 R |
| GB | 1597021 | A1 * | 9/1981 | | |
| IT | 591455 | A1 * | 4/1959 | | 43/19 |
| JP | 1-285137 | B1 * | 11/1989 | | |
| JP | 7-327552 | B1 * | 12/1995 | | |
| JP | 8-172979 | B1 * | 7/1996 | | |
| JP | 9-191800 | B1 * | 7/1997 | | |
| JP | 11-178478 | B1 * | 7/1999 | | |
| JP | 2000-189019 | B1 * | 7/2000 | | |
| JP | 2001-57830 | B1 * | 3/2001 | | |
| JP | 2001-269084 | B1 * | 10/2001 | | |
| JP | 2002-262723 | B1 * | 9/2002 | | |
| JP | 2003-174836 | B1 * | 6/2003 | | |
| NO | 84236 | A1 * | 7/1954 | | 43/19 |
| RU | 651765 | A1 * | 3/1979 | | 43/18.1 CT |
| WO | WO-99/22592 | A1 * | 5/1999 | | |

* cited by examiner

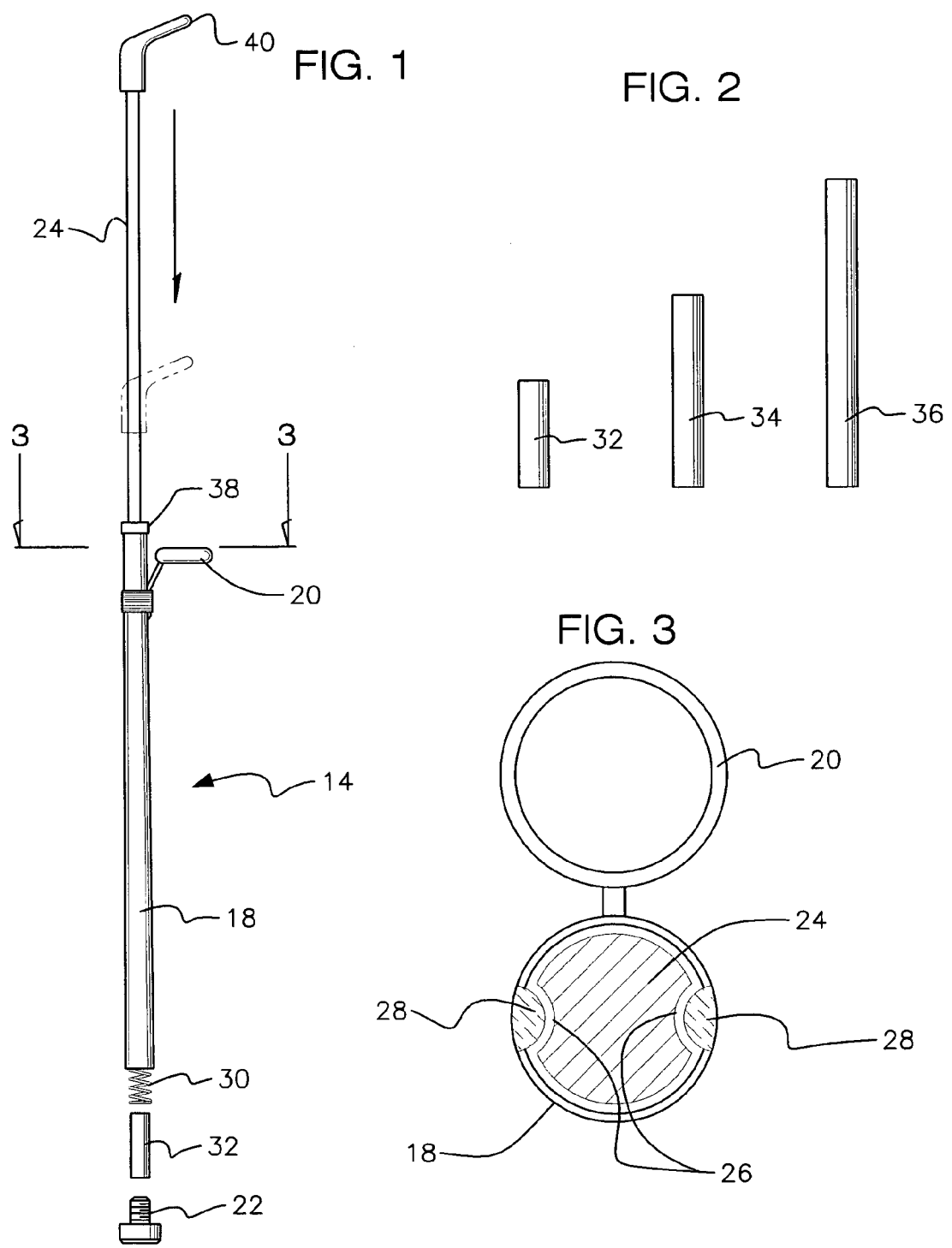

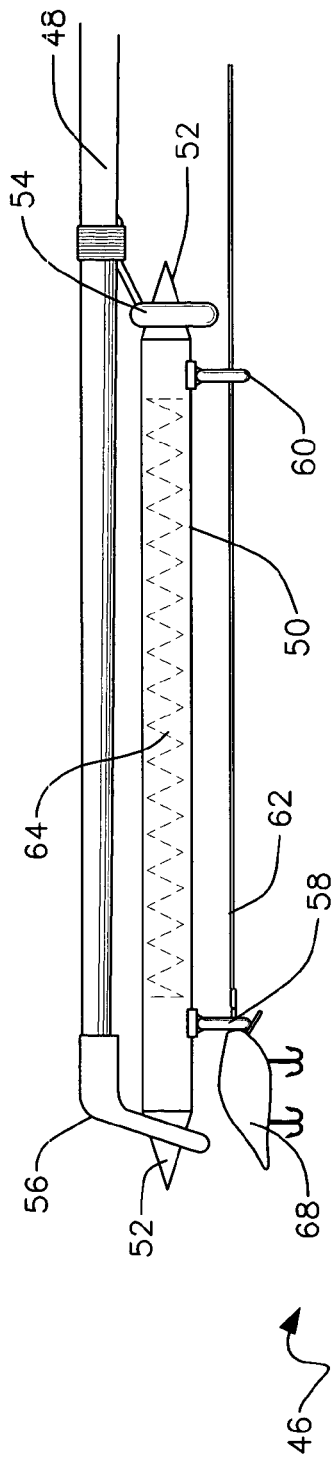
FIG. 6
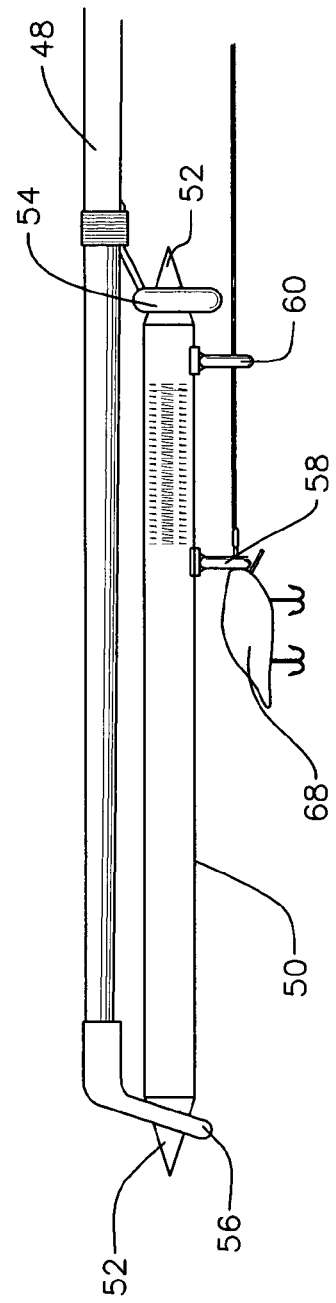
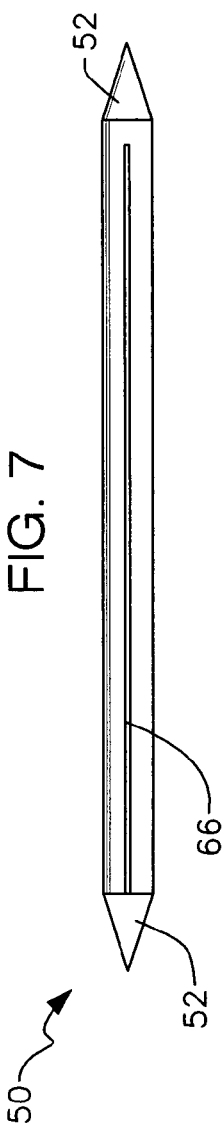
FIG. 7

SPRING LOADED FISHING ROD

BACKGROUND OF THE INVENTION

1. Field of the Invention

The present invention relates to a fishing lure casting apparatus for use in connection with propelling a fishing lure from a fishing rod. The spring loaded fishing rod has particular utility in connection with catapulting a fishing lure from a fishing pole without using a swinging motion of the arm.

2. Description of the Prior Art

One of the most important steps in fishing is successfully casting the lure into the desired area of water selected for fishing. Oftentimes, a fisherman will cast multiple times until he is satisfied with the placement of the lure. Many times, a fisherman settles for a cast that is not as lengthy as desired, especially if there is an obstruction, such as weeds, a fallen log, a reef, or a breaker, over which he wished to cast. The ability to produce a lengthier, more accurate cast would increase both the pleasure and success of a fishing expedition.

Some fishing locations are located in dense underbrush. This underbrush makes it difficult to fully manipulate the fishing rod to produce an accurate cast. Frequently, a suitable cast is difficult, if not impossible, to obtain since the line or the hook become entangled in the brush when the arm is swung to make the cast. Therefore, a device which could be used to accurately propel the fishing lure from the rod without using a swinging motion of the arm would be extremely useful to an angler fishing in such an environment. Additionally, a fisherman suffering from arthritis or other upper body physical limitations would be able to use such a device in all fishing activities, leading to a more enjoyable fishing experience.

Many anglers already own fishing poles and would be unwilling or unable to purchase a new fishing pole including a device for propelling the fishing lure from the rod. Thus, an aftermarket device that could be added to an existing fishing pole for the above purpose would be highly desirable to many fishermen.

The use of devices which automatically cast fishing lures is known in the prior art. For example, U.S. Pat. No. 3,365,834 to Leon J. Kreft discloses a coiled spring apparatus for expelling a special bullet shaped lure with a compressed spring. The lure is shaped with grooves for concealing the hooks and fishing line so they do not become entangled as the lure is shot from an attachment to the fishing rod. However, the Kreft '834 patent is complex and requires the user to buy a specialized rod and custom lures. This could make the device cost prohibitive to many fishermen. Additionally, the Kreft '834 patent does not offer the user a device that can be used to retrofit an existing fishing pole. Thus, the fisherman would either need to store multiple poles or dispose of his existing rod. Finally, wear on the ratchet bar and the devices which interact with it could lead the Kreft '834 device to malfunction with excessive usage, requiring the replacement of the entire rod in the case of a worn ratchet bar.

U.S. Pat. No. 3,656,252 to Samuel S. Sherman discloses a fishing pole and casting mechanism adapted to propel a lure, bait, float, or sinker with an attached fishing line by using a compressed spring launcher. The device comprises a spring gun incorporated in the handle of the fishing pole which mounts a conventional casting reel and is characterized by the extension of the conventional fishing rod in alignment with the casting reel and by the provision of selectively adjustable cocking means for altering the casting distance. However, the Sherman '252 patent requires that additional items be added to the fishing pole, some of which are offset from the longitudinal axis of the pole. This could skew the balance of the pole and cause errors in judging casting angles. Additionally, the Sherman '252 device places the lure in an open cup from which it could fall as the fisherman prepares to cast. Lastly, the Sherman '252 device requires the fishing line be brought back toward the fisherman to place the lure in the launcher. This could lead to possible entanglements of the line.

Similarly, U.S. Pat. No. 5,926,991 to John M. Chestnut discloses a fishing pole which can throw a fishing line connected to a hook through the use of a compression spring mounted on the rod. The compression spring is externally radially mounted around the fishing pole rod and uses a specialty line carrier which is slideably mounted on the pole to compress the spring. However, the Chestnut '991 patent requires the user to purchase a specialty pole and line carriers and cannot be installed on an existing pole. This could be cost prohibitive to many users, especially if additional line carriers are required due to the fisherman cutting the line during entanglements. Additionally, no provision is made in the Chestnut '991 patent to hold the compressed spring while the user adjusts the reel to freely release the line. Should the user accidentally let go of the line carrier, the spring would prematurely launch the hook and could break the fishing line in the process. Moreover, many individuals might lack the strength to not only compress the spring of the Chestnut '991 device, but also to hold the compressed spring while adjusting the line. Finally, if the fishing line should break toward the pole end, the user of the Chestnut '991 device would need to thread the line back through the center of the pole, which could be time consuming and frustrating for many individuals.

U.S. Pat. No. 3,416,256 to Andrew R. Blocker discloses a catapulting casting rod with an ejection cup that uses an elastic band located in the rod to launch a lure or bait from the fishing pole. However, the elastic band of the Blocker '256 patent may lose elasticity over time due to excessive usage. Additionally, the Blocker '256 device could become inoperable if the band were to snap due to stress, fatigue, or flaw. In either of these events, the owner would need to completely dismantle the rod to replace the elastic or he would need to purchase a new rod. Lastly, when the lure is placed in the ejection cup of the Blocker '256 device, the fishing line could become entangled with the hooks, causing unsuccessful results when attempting to catch a fish.

Likewise, U.S. Pat. No. 5,491,924 to Elias Athanasiadis discloses a spring powered fishing line casting instrument that includes an elongated tube containing a compressed spring unit, into which tube a sinker connected to a fishing line is placed in abutment with the compressed spring unit. The compressed spring is held in place by a stop, which, when released, allows the spring to fully extend and eject the sinker from the forward portion of the tube. However, the Athanasiadis '924 device requires the user to purchase specialty sinkers that are formed specifically to fit inside the tube from which it will be catapulted. These custom sinkers could be more expensive and harder to find than other sinkers. Furthermore, no indication is made in the Athanasiadis '924 patent that the device can be added to an existing fishing pole, so the expense of a specialty pole is also a possibility with this device. Finally, the user may not have the strength required by the Athanasiadis '924 patent to sufficiently recompress the spring wherein the stop can be placed in position.

Lastly, U.S. Pat. No. Des. 325,421 to Toshihiko Yasui discloses the ornamental design for a fishing rod. However, the Yasui '421 patent makes no indication that the device will aid the fisherman in casting a lure or sinker without using a swinging motion of the arm. Furthermore, the Yasui '421 device is a custom rod which could be cost prohibitive to many consumers.

While the above-described devices fulfill their respective, particular objectives and requirements, the aforementioned patents do not describe a spring loaded fishing rod that can be retrofitted on an existing rod to cast a lure without using a swinging motion of the arm. The Yasui '421 patent makes no indication that the device will aid the fisherman in casting a lure or sinker without using a swinging motion of the arm, while the Kreft '834, Chestnut '991, Athanasiadis '924, and Yasui '421 devices require the fisherman to purchase custom items such as poles, lures, and sinkers, which could be harder to find and cost prohibitive for the user. Furthermore, the Kreft '834 and Athanasiadis '924 patents make no indication that the devices can be added to an existing fishing pole, so the fisherman would need to purchase and store multiple poles. The Kreft '834 and Blocker '256 devices are susceptible to damage and inoperability due to wear and stress, the Kreft '834 device on the ratchet bar and the Blocker '256 device on the elastic band. Additionally, the Sherman '252 and Blocker '256 devices place the lure in an open cup from which it could fall as the fisherman prepares to cast and in which the fishing line could become entangled with the hooks, causing unsuccessful results when attempting to catch a fish. Moreover, the Sherman '252 patent requires the fishing line be brought back toward the fisherman to place the lure in the launcher, leading to possible entanglements of the line. Younger individuals or those suffering from arthritis or other ailments might lack sufficient strength to correctly operate the Chestnut '991 and Athanasiadis '924 devices. In addition, no provision is made in the Chestnut '991 patent to hold the compressed spring while the user adjusts the reel to freely release the line. Should the user accidentally let go of the line carrier, the spring would prematurely launch the hook and could break the fishing line in the process. The user of the Chestnut '991 device would then need to thread the line back through the center of the pole, which could be time consuming and frustrating for many individuals. Finally, the Sherman '252 patent requires additional equipment to be added to the fishing pole on an offset longitudinal axis from that of the pole, skewing the balance of the pole and leading to possible errors when judging casting angles.

Therefore, a need exists for a new and improved spring loaded fishing rod that can be found standard on a new fishing pole or retrofitted on an existing pole and can be used by the fisherman to automatically launch a fishing lure. In this regard, the present invention substantially fulfills this need. In this respect, the spring loaded fishing rod according to the present invention substantially departs from the conventional concepts and designs of the prior art, and in doing so provides an apparatus primarily developed for the purpose of catapulting a fishing lure from a fishing pole without using a swinging motion of the arm.

SUMMARY OF THE INVENTION

In view of the foregoing disadvantages inherent in the known types of devices which automatically cast fishing lures now present in the prior art, the present invention provides an improved spring loaded fishing rod, and overcomes the above-mentioned disadvantages and drawbacks of the prior art. As such, the general purpose of the present invention, which will be described subsequently in greater detail, is to provide a new and improved spring loaded fishing rod and method which has all the advantages of the prior art mentioned heretofore and many novel features that result in a spring loaded fishing rod which is not anticipated, rendered obvious, suggested, or even implied by the prior art, either alone or in any combination thereof.

To attain this, the present invention essentially comprises a two part fishing pole in which the top portion has a hollow tube with an enclosed spring and a rod mounted on the distal end. The rod is capable of sliding into the tube to compress the spring when pressure is applied to the end eye of the rod. When the pressure is released from the spring, it expands and propels the lure toward the desired location.

A second embodiment of the present invention consists of a spring loaded cartridge that is suspended from the last two eyes on a conventional fishing rod. The cartridge has two "replacement" eyes through which the fishing line is strung and a longitudinal slot formed along its length. The end eye of the cartridge is capable of sliding along the slot to compress the spring. When the pressure is released from the spring, it expands and propels the lure toward the desired location.

A third embodiment of the present invention consists of a spring loaded tube which is mounted on the distal end of the fishing pole. The end eye, which is located at the end of the tube, slides along a longitudinal slot formed in the tube to compress the enclosed spring. When the pressure is released from the spring, it expands and propels the lure toward the desired location.

There has thus been outlined, rather broadly, the more important features of the invention in order that the detailed description thereof that follows may be better understood and in order that the present contribution to the art may be better appreciated.

The first embodiment of the invention may also include variable length spacers which can be placed against the end of the spring to increase the tension on the spring to support casting with heavier lures and/or fishing lines. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved spring loaded fishing rod that has all of the advantages of the prior art devices which automatically cast fishing lures and none of the disadvantages.

It is another object of the present invention to provide a new and improved spring loaded fishing rod that may be easily and efficiently manufactured and marketed.

An even further object of the present invention is to provide a new and improved spring loaded fishing rod that has a low cost of manufacture with regard to both materials and labor, and which accordingly is then susceptible of low prices of sale to the consuming public, thereby making such a spring loaded fishing rod economically available to the buying public.

Still another object of the present invention is to provide a new spring loaded fishing rod that provides in the apparatuses and methods of the prior art some of the advantages thereof, while simultaneously overcoming some of the disadvantages normally associated therewith.

Even still another object of the present invention is to provide a spring loaded fishing rod for allowing a fisherman to cast without using a swinging motion of the arm. This allows users with arthritis or upper body disabilities to accurately cast, making fishing more enjoyable and more successful.

Yet another object of the present invention is to provide a spring loaded fishing rod for allowing a fisherman to successfully cast from beneath overhanging trees or while surrounded by dense underbrush. This allows the angler to successfully cast in these conditions without entangling his line or hook on surrounding plant life, making the fishing experience more relaxing and successful.

Even yet another object of the present invention is to provide a spring loaded fishing rod which can be assembled by adding a spring loaded cartridge to an existing fishing rod. This allows the fisherman to save money by retrofitting an existing rod instead of purchasing a new rod.

Still yet another object of the present invention is to provide a spring loaded fishing rod which allows the user to compress the spring by using the reel on the fishing rod. This allows younger fisherman or those with limited hand or arm strength to enjoy the benefits of a spring loaded rod.

Lastly, it is an object of the present invention to provide a new and improved spring loaded fishing rod that provides variable sized spacers that increase the compression of the spring for casting with heavier lures and/or fishing lines. This allows the fisherman to utilize one rod to accurately cast in different types of water and for various types of fish.

These together with other objects of the invention, along with the various features of novelty that characterize the invention, are pointed out with particularity in the claims annexed to forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevation view of the upper portion of the preferred embodiment of the spring loaded fishing rod constructed in accordance with the principles of the present invention.

FIG. 2 is a side elevation view of the spacers of the spring loaded fishing rod of the present invention.

FIG. 3 is a top cross sectional view of the spring loaded fishing rod of the present invention taken along a radial cut.

FIG. 6 is a side elevation view of the second embodiment of the spring loaded fishing rod of the present invention.

FIG. 7 is a bottom view of the spring loaded cartridge of the second embodiment of the spring loaded fishing rod of the present invention.

The same reference numerals refer to the same parts throughout the various figures.

DESCRIPTION OF THE PREFERRED EMBODIMENT

Figure 4:
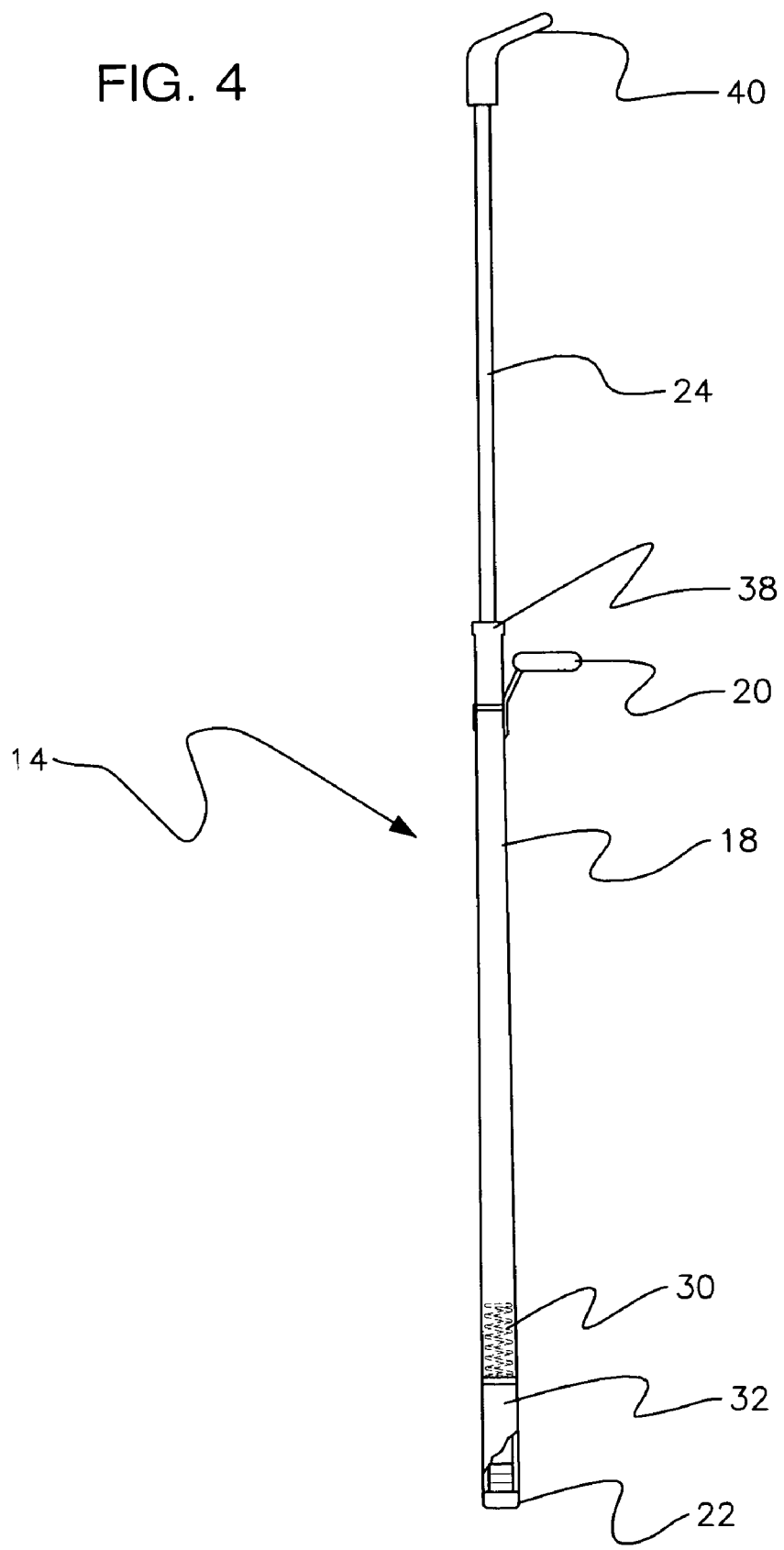
FIG. 4 is a side elevation view of the spring loaded fishing rod of the present invention with a cutaway view of the shaft and compression spring of the upper portion.

Referring now to the drawings, and particularly to FIGS. 1–7, a preferred embodiment of the spring loaded fishing rod of the present invention is shown and generally designated by the reference numeral 10.

Figure 5:
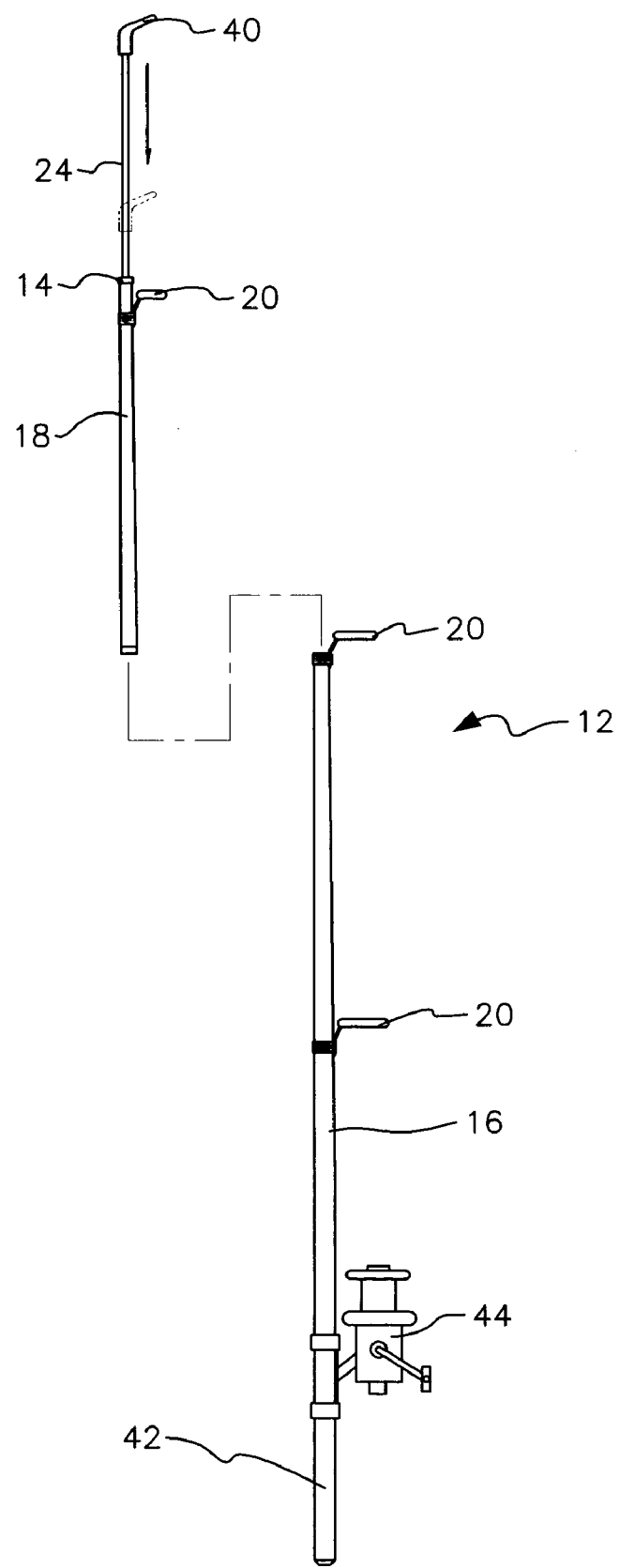
FIG. 5 is an exploded view of the spring loaded fishing rod of the present invention.

In FIGS. 1–5, a new and improved spring loaded fishing rod 10 of the present invention for catapulting a fishing lure from a fishing pole without using a swinging motion of the arm is illustrated and will be described. More particularly, the first embodiment of the spring loaded fishing rod 10 consists of a two-piece spinning rod 12 in which the upper portion 14 and the lower portion 16 of the rod 12 are of equal lengths. The upper portion 14 of the rod 12 is featured in FIGS. 1–4, while FIG. 5 shows the upper portion 14 of the rod 12 as it interrelates to the lower portion 16 of the rod 12. The upper portion 14 of the rod 12 has a hollow cylindrical shaft 18 featuring the third eye 20 and a removable threaded end cap 22, such as a thumb screw. A slender cylindrical rod 24 is mounted on the shaft 18 and is capable of sliding into the shaft 18 due to concave grooves 26 cut on either side of its outer surface. FIG. 3 shows how ridges 28 formed on the interior of the shaft 18 mate with the grooves 26 and allow the rod 24 to slide into the shaft 18. The end cap 22 is removed, and a compression spring 30 is loaded into the hollow of the shaft 18 followed by a spacer unit 32, both of which are held in place by the end cap 22. The spacer unit 32 is used to slightly compress the spring 30 and provide a stable base against which the spring 30 can push when the tension is released. To increase the tension on the spring 30, the fisherman can remove the end cap 22 and insert a different length spacer unit 32. FIG. 2 shows small, medium, and large spacer units, 32, 34, and 36, respectively. The small spacer unit 32 might be used to cast a ⅜ oz lure, the medium spacer unit 34 a ½ oz lure, and the large spacer unit 36 a ¾ oz lure. These different spacer units 32 would be chosen to facilitate casting longer distances or heavier lures or lines. The rod 24 would feature an interior diameter at the insertion point 38 (see FIG. 3) of the two pieces measuring approximately 3/16". An end eye 40 is mounted on the distal end of the rod 24. The end eye 40 is responsible for catching the lure or bait and restricting it from passing through the eye 40 and down the fishing rod 12. When the fisherman pulls the fishing line toward the proximal end 42 of the fishing rod 12, the spring 30 is compressed, and when he releases the line, the spring 30 expands and propels the lure outward toward the desired destination. Examiner has objected to the disclosure because an incorrect part number was referenced. This part number has been amended as shown in the above paragraph; therefore, the specification is now in condition for allowance.

FIG. 4 displays a cutaway view of the shaft 18 of the upper portion 14 of the fishing rod 12. As the fishing line is pulled toward the fisherman, the lure catches on the end eye 40 and pulls the cylindrical rod 24 into the shaft 18. This serves to compress the spring 30 towards the spacer unit 32. When the line is released, the spring 30 will expand, expelling the rod 24 from the shaft 18 and propelling the lure outward towards the desired location. FIG. 5 indicates the connection between the upper and lower portions, 14 and 16, of the spring loaded fishing rod 10. The end cap 22 is inserted into the lower portion 16 at the second eye 20. The first eye 20 is located closer to the reel 44. The fisherman would use the reel 44 to manipulate the fishing line, effectively compressing the spring 30 when the line is wound toward the fisherman.

FIGS. 6 and 7 feature a second embodiment of the spring loaded fishing rod 46 of the present invention. This embodiment is intended to serve as an add-on feature for existing fishing poles 48. A spring loaded cartridge 50 is suspended below a fishing pole 48 by inserting its ends 52 through the third and end eyes, 54 and 56, respectively. The ends 52 are tapered to allow easy insertion into the eyes 54 and 56. A sliding end eye 58 and a replacement eye 60 are located on the bottom of the cartridge 50. The fishing line 62 would be strung through the replacement eye 60 and the sliding end eye 58 of the cartridge 50 instead of through the third and end eyes, 54 and 56, of the fishing pole 48. A spring 64 inside the cartridge 50 is compressed as the sliding end eye 58 is pulled backwards toward the reel on the fishing pole 48. FIG. 7 shows the slot 66 in the bottom of the cartridge 50 which allows the sliding end eye 58 to move along the cartridge 50. When a lure 68 is affixed to the end of the fishing line 62 and the line 62 is wound, the lure 68 is caught by the sliding end eye 58 and pulls it backwards, effectively compressing the spring 64. When the tension on the line 62 is released, the spring 64 expands, propelling the lure 68 forward toward the desired location.

A third embodiment of the spring loaded fishing rod, which is not portrayed in the figures, consists, of a fishing rod with an upper section containing a compression spring and a lower section. The upper section is formed with a longitudinal slot along its outer surface. The fishing lure is reeled up to the end eye of the rod, and as the user pulls on the line, the end eye slides along the slot and compresses the spring. When the line is released, the spring expands and propels the lure in the desired location.

While a preferred embodiment of the spring loaded fishing rod has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as metal, plastic, or a variety of wood may be used for the fishing pole described. Furthermore, a wide variety of natural and artificial baits, sinkers, weights, hooks, and other fishing paraphernalia may be used instead of the lure described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A spring loaded fishing rod comprising:
   an elongated cylindrical rod having a top end, a bottom end, and an outer surface, wherein said rod is formed with a pair of longitudinal concave grooves on said outer surface, and wherein said grooves are parallel to each other and to the longitudinal axis of said rod and would both be bisected by a plane that bisected said longitudinal axis of said rod and one groove of said pair of grooves;
   an elongated, hollow cylindrical tube having a top end, a bottom end, an outer surface, and an inner surface, wherein said inner surface of said tube is formed with a pair of longitudinal ridges, and said tube being slideably connected on said top end to said bottom end of said cylindrical rod, and wherein said ridges slide through said grooves of said rod when said rod is inserted into said tube;
   a compression spring having a first end and a second end and connected to said tube, wherein said spring resides in the hollow of said tube;
   a spacer unit having a first end and a second end and removably connected to said spring and said tube wherein said spacer unit is inserted into the hollow of said tube after said spring and said second end of said spring rests against said first end of said spacer unit;
   an end cap removably connected to said bottom end of said tube, wherein said end cap holds said spring and said spacer unit inside said tube;
   an elongated pole having an outer surface, a top end formed with a small hollow, and a bottom end and said pole being connected on said top end to said end cap, wherein said end cap is inserted into said hollow and wherein said elongated pole has the same length as said rod and said tube when said rod and said tube are joined together;
   a plurality of eyes connected to said outer surfaces of said pole, said tube, and said rod, wherein one of said eyes is connected to said top end of said rod and serves as an end eye; and
   a reel connected to said outer surface of said elongated pole near said bottom end.

* * * * *